United States Patent [19]
Ollivier

[11] Patent Number: 5,411,209
[45] Date of Patent: May 2, 1995

[54] ANTI-HAIL SHOCK WAVE GENERATOR

[76] Inventor: Gérald Ollivier, 1625 Lincoln Avenue #1901, Montreal, Quebec, Canada, H3H 2T5

[21] Appl. No.: 138,598

[22] Filed: Oct. 18, 1993

[51] Int. Cl.$^6$ ............................................. A01G 15/00
[52] U.S. Cl. .................................. 239/14.1; 239/424; 239/428.5
[58] Field of Search .................... 239/14.1, 428.5, 424, 239/423

[56] References Cited

U.S. PATENT DOCUMENTS

| | | |
|---|---|---|
| 684,030 | 10/1901 | Wright . |
| 2,192,471 | 3/1940 | Harbison . |
| 2,815,982 | 12/1957 | Bleamaster ........................ 239/14.1 |
| 2,968,713 | 1/1961 | Harper . |
| 3,362,915 | 1/1968 | Micek .................................. 239/14.1 |
| 3,695,446 | 2/1972 | Patton ................................ 239/14.1 |
| 3,848,801 | 11/1974 | Ollivier et al. . |
| 3,969,842 | 7/1976 | Velie . |
| 4,835,359 | 5/1989 | Sciortino . |

FOREIGN PATENT DOCUMENTS 52-62943  5/1977  Japan .
1012056 12/1965 United Kingdom ............... 239/14.1

Primary Examiner—Andres Kashnikow
Assistant Examiner—Kevin P. Weldon
Attorney, Agent, or Firm—Merchant & Gould, Smith, Edell, Welter & Schmidt

[57] ABSTRACT

To improve the transmission of positive ions from ground level to cloud level by a shock wave generator, a shroud is provided which surrounds the barrel of the generator for guiding a convective air flow vertically along the sides of the barrel to an orifice of the barrel. Positive ions present in the ambient air and also created by the environment surrounding the hot barrel are drawn upwardly by convection and a negative pressure following each explosion. The shroud is higher than the barrel and positive ions are drawn into the area in front of the barrel where shock waves displace the ions upwardly to cloud level for preventing hail nuclei formation.

2 Claims, 2 Drawing Sheets

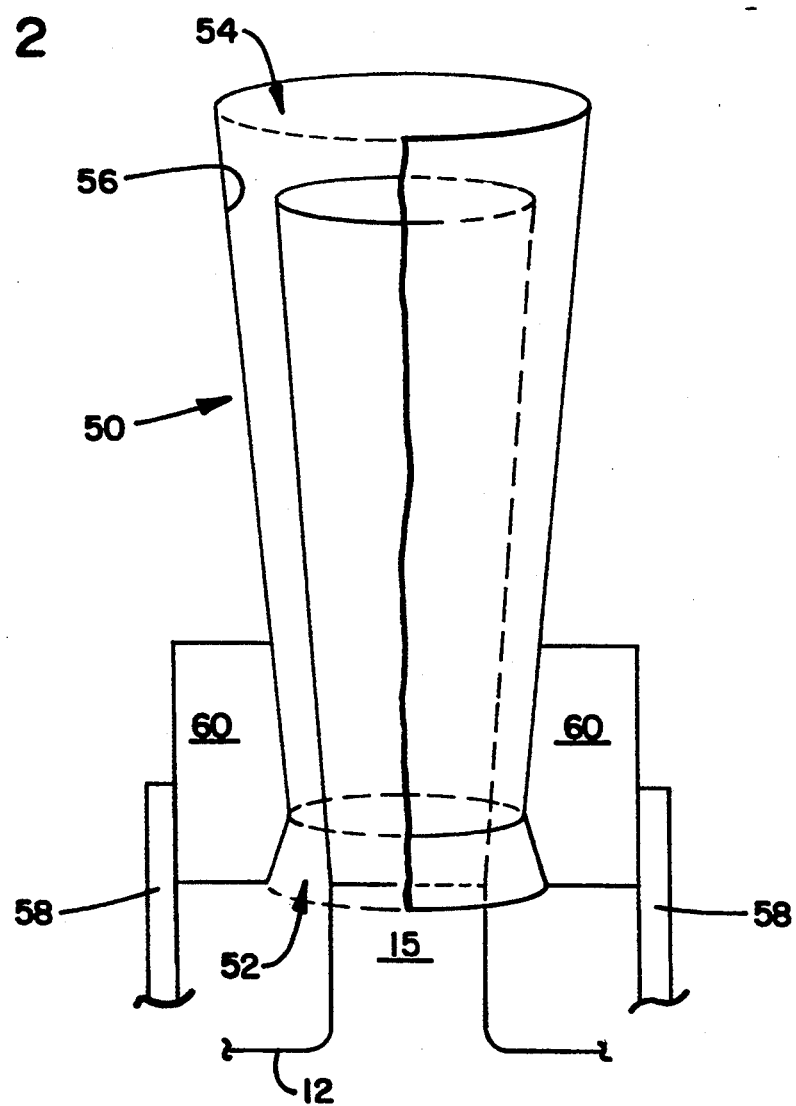

ANTI-HAIL SHOCK WAVE GENERATOR

FIELD OF THE INVENTION

The present invention relates to an anti-hail shock wave generator including a shroud member surrounding a barrel of the generator for directing positive ions in front of the barrel.

BACKGROUND OF THE INVENTION

An anti-hail shock wave generator or cannon is known in the art from U.S. Pat. No. 3,848,801. In such a device, a shock wave is generated by detonating an explosive mixture of combustible gas and air in a combustion chamber having an upper orifice. A conical barrel is fit over the upper orifice and directs the shock wave resulting from the explosion upwardly to the sky. By firing the generator at regular intervals (eg. less than 25 seconds, and usually every 8 to 14 seconds), a succession of shock waves are created which disrupts the internal microstructure of the clouds to prevent the formation of hail nuclei within a small area (typically a 500 m radius) over the generator. It is believed that transport of positive ions from ground level to cloud level by the succession of shock waves is largely responsible for the disruption of the formation of hail nuclei.

By using the known device, crop damage due to hail has been known to be completely eliminated or at least significantly reduced without any adverse environmental effects, however, to achieve good results, special care must be taken to operate the device properly starting about 15–25 minutes before a hail storm in order to disrupt sufficiently the hailstone formation process. By operating the device at a faster firing rate, the combustion chamber and the barrel are subjected to more mechanical and temperature stress, and more fuel is consumed.

SUMMARY OF THE INVENTION

It is an object of the present invention to provide an anti-hail shock wave generator with an enhanced ability to provide positive ions in front of the barrel opening.

When the generator is operated at a faster rate (less than 8 seconds between firings), the temperature of the uninsulated combustion chamber and the barrel rises. At these higher temperatures, the barrel is able to ionize gas particles (creating positive ions) in the surrounding air, and these ionized gas particles located inside the barrel are propelled upwardly by the explosion and the resulting shock waves. Positive ions neutralize negatively charged particles in hail producing clouds, with the result of arresting the hail formation process.

According to the invention, there is provided an anti-hail shock wave generator comprising a combustion chamber having an upper orifice, fuel injection means for injecting fuel into the chamber, ignition means for igniting the fuel in the chamber, a conical barrel having a small diameter lower end connected to the upper orifice and a large diameter upper end, a shroud member surrounding the barrel, the shroud having a top extending above the upper end, and means for mounting the shroud member over the barrel with a separation between the shroud and the barrel being selected to aid convective air flow carrying ionized particles from the surface of the barrel to the upper end.

BRIEF DESCRIPTION OF THE DRAWINGS

The invention will be better understood by way of the following detailed description of a preferred embodiment with reference to the appended drawing in which:

FIG. 2 is a detailed cross-sectional view of the barrel shroud according to the preferred embodiment.

DETAILED DESCRIPTION OF THE PREFERRED EMBODIMENT

Figure 1:
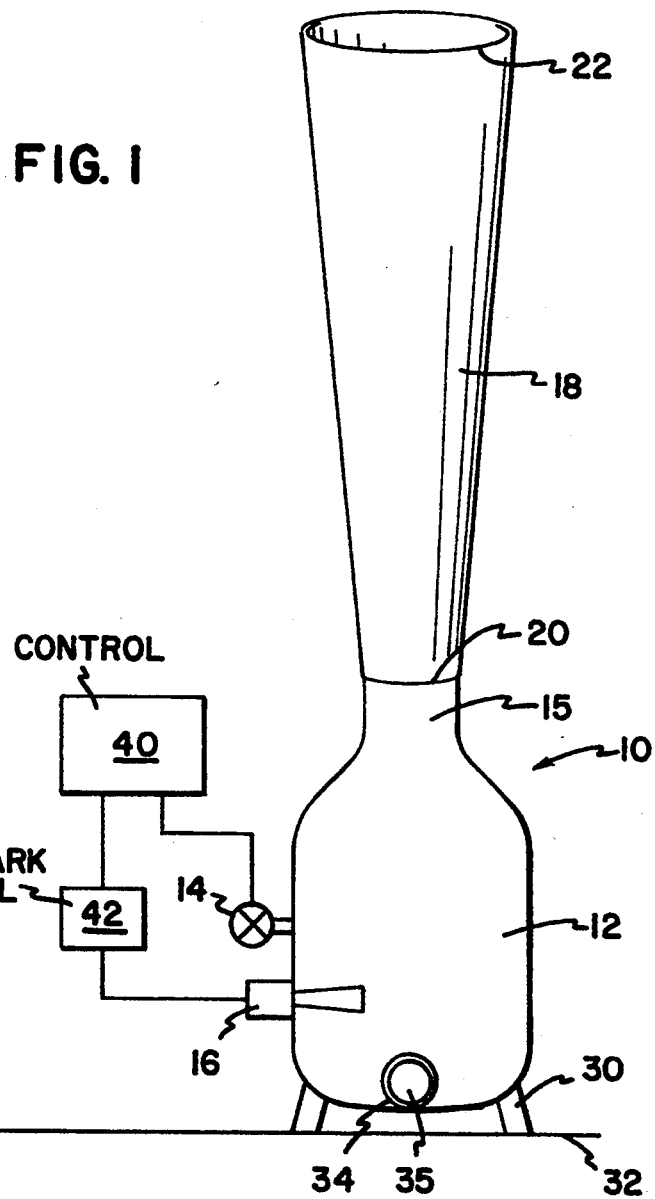
FIG. 1 is a side view of the anti-hail shock wave cannon according to the preferred embodiment.

As shown in FIG. 1, cannon (10) comprises a combustion chamber (12) which may comprise a substantially cylindrical body with a rounded bottom and a rounded top portion which leads into a neck (15). The bottom of combustion chamber (12) is solidly mounted to a concrete pad (32) by feet (30). One or more air inlet ports (34) are provided with flaps (35) which are seated in ports (34) and open inwardly to provide one way valves for air rushing into chamber (12) after each ignition. Chamber (12) is provided with a fuel injector (14) which may comprise a solenoid valve controlling flow of acetylene gas from a an acetylene gas reservoir (not shown) into a central portion of chamber (12). Ignition means (16) are provided for igniting the acetylene gas injected into chamber (12), and ignition means (16) comprise spark gap electrodes and a high voltage generator coil (42). The spark gap generator coil (42) and solenoid valve (14) are controlled by control means (40). A conical barrel (18) has a large diameter upper end (22) and a small diameter lower end (20) which is connected to an upper orifice in neck (15) of chamber (12).

When the shock wave generator cannon (10) is operated, control means (40) cause gas to be released through solenoid valve (14) into chamber (12) until sufficient gas for a full explosion resulting in a significant shock wave is present in chamber (12). Mixing of the acetylene gas with air in chamber (12) is automatic and rapid. A short time after solenoid valve (14) is closed, control means (40) trigger spark gap coil (42) to create a high voltage pulse resulting in a spark across the electrodes of ignition means (16). As the gas in chamber (12) rapidly combusts, a shock wave results which is directed by conical barrel (18). The momentum of the combustion gases is directed upwardly, and once the combustion gases have fully expanded, the upward momentum of the gases causes a negative pressure to be created in the combustion chamber (12) which results in flap (35) being drawn open so that fresh air may be drawn from ambient through port (34) to fill combustion chamber (12).

As shown in FIG. 2, the shroud member (50) comprises an inner sheet member (56), a plurality of support ribs (60) and legs (58). Fresh air is drawn in at bottom inlet (52) and caused to rise in the space between sheet (56) and barrel (18) by convection. Convection causes air to flow towards the end (22) of barrel (18), allowing for the shocks waves generated to propagate the positive ions naturally occuring in the air upwardly. The conditions of high temperature and possibly shock waves in the space between sheet (56) and the barrel (18) also help increase the concentration of positive ions in the air. Since barrel (18) will dissipate less heat and therefore maintain a higher temperature if its coefficient of radiant emission is low, the material for barrel (18) is selected to have a lower emissivity, such as stainless steel.

Ribs (60) are preferably between three and six in number and are welded to two parts of inside sheet (56) to form the inwardly tapered inlet (52) and the outwardly tapered upper portion end with upper outlet (54). While the inside sheet (56) may comprise truncated conical parts, it is possible to form shroud (50) with a polygonal cross-section, provided air driven by convection is able to be guided from the inlet (52) to the outlet (54). The material for shroud (50) should be resistant to elevated temperatures while able to withstand rain and wind.

As can be appreciated, wind could clear away any positive ions guided to end (22) by shroud (50), and therefore, it is advantageous to provide outlet end (54) a little higher than barrel end (22) to provide some shelter from the wind. Smaller air currents present in the region in front of end (22) help to mix the ion enriched air from shroud (50) with the air in front of end (22). Preferably, the shroud (50) stands about 20 cm to 30 cm higher than end (22) when barrel (18) is 3 m to 6 m high. Lower diameter (20) is preferably about 10 cm to 14 cm and upper end (22) preferably has a diameter of about 80 cm. The angle of inclination of the side of barrel (18) is preferably about 7° to 9°, and sheet (56) is approximately parallel to barrel (18) in its upper portion. Therefore, the upper diameter of shroud (50) is about 90 cm to 120 cm.

It is important to select a fuel and ignition system which can operate even when rain water passes through barrel (18) into chamber (12). It is important to select the parameters of fuel, combustion chamber volume to upper orifice size as well as barrel (18) dimensions in order that a good shock wave is generated and sufficient aspiration through ports (34) takes place in order to bring in sufficient fresh air for the next combustion.

The preferred material for combustion chamber (12) is steel having a wall thickness of about 0.6 cm to 1.0 cm. Ports (34) are preferably two in number and have a diameter of about 15 cm. The combustion chamber has an internal diameter of about 45 cm and a volume of about 160 to 180 liters. The volume of acetylene gas injected is about 5 to 10 liters and the recommended time period between ignitions is 3.5 to 6 seconds.

Although the invention has been described above with reference to the example of the preferred embodiment, it is to be understood that other embodiments are contemplated by the invention as defined in the appended claims.

I claim:

1. An anti-hail shock wave generator comprising:
 a combustion chamber having an upper orifice;
 fuel injection means for injecting fuel into said chamber;
 ignition means for igniting said fuel in said chamber;
 a conical barrel having a small diameter lower end connected to said upper orifice and a large diameter upper end;
 a shroud member, surrounding said barrel, vertically guiding an upward convective air flow carrying ionized particles towards said upper end, said shroud member having a top extending above said upper end; and
 means for mounting said shroud member around said barrel with a separation between said shroud member and said barrel.

2. An anti-hail shock wave generator as claimed in claim 1, wherein said shroud member is conical, said separation is substantially even from a middle of said barrel to said upper end, and said shroud member comprises an outwardly flaired lower conical section near said chamber.

* * * * *